United States Patent
Hamamoto et al.

(10) Patent No.: US 7,823,931 B2
(45) Date of Patent: Nov. 2, 2010

(54) TUBULAR THREADED JOINT

(75) Inventors: Takahiro Hamamoto, Wakayama (JP); Katsutoshi Sumitani, Wakayama (JP); Masaaki Sugino, Nishinomiya (JP); Michihiko Iwamoto, Wakayama (JP); Miyuki Yamamoto, Izumiotsu (JP); Jean-Francois Charvet-Quemin, Lille (FR); Benoit Le Chevalier, Noyelles sur Sambre (FR); Eric Verger, Gommegnies (FR)

(73) Assignees: Sumitomo Metal Industries, Ltd., Osaka (JP); Vallourec Mannesmann Oil & Gas France, Aulnoye-Aymeries ( * ) Notice: Subject to any disclaimer, the term of this patent is extended or adjusted under 35 U.S.C. 154(b) by 0 days.

(21) Appl. No.: 12/232,362

(22) Filed: Sep. 16, 2008

(65) Prior Publication Data

US 2009/0200798 A1    Aug. 13, 2009

Related U.S. Application Data

(63) Continuation of application No. PCT/JP2007/057516, filed on Mar. 28, 2007.

(30) Foreign Application Priority Data

Mar. 31, 2006    (JP) ............................. 2006-099296

(51) Int. Cl.
  F16L 25/00    (2006.01)
(52) U.S. Cl. ...................................... 285/334
(58) Field of Classification Search ................. 285/333, 285/334
  See application file for complete search history.

(56) References Cited

U.S. PATENT DOCUMENTS

| | | | | |
|---|---|---|---|---|
| 2,893,759 | A | * | 7/1959 | Blose .......................... 285/334 |
| 4,600,225 | A | * | 7/1986 | Blose .......................... 285/334 |
| 4,707,001 | A | * | 11/1987 | Johnson .................... 285/332.3 |
| 5,007,665 | A | * | 4/1991 | Bovisio et al. .............. 285/334 |
| 5,931,511 | A | * | 8/1999 | DeLange et al. ............ 285/334 |
| 6,322,110 | B1 | | 11/2001 | Banker et al. |
| 6,454,315 | B1 | * | 9/2002 | Yamaguchi ................ 285/334 |

(Continued)

FOREIGN PATENT DOCUMENTS

JP    06-281059    10/1994

(Continued)

*Primary Examiner*—David E Bochna
(74) *Attorney, Agent, or Firm*—Clark & Brody

(57) ABSTRACT

A tubular threaded joint which has excellent resistance to compression and which permits easy tightening operation in the field in a vertical state comprises a pin having a male threaded zone and a box having a female threaded zone. The pin or the box has an end shoulder surface on its end, and the other member has a shoulder surface which abuts against the end shoulder surface. The screw threads of the male threaded zone and the female threaded zone are trapezoidal threads having a crest, a load flank, and a stabbing flank. The lip length, which is the distance in the axial direction of a member having an end shoulder surface between the end shoulder surface and the closest engaged thread to that surface, is at least 140 times the stabbing flank clearance, which is the distance in the axial direction between the stabbing flanks of the male thread and the female thread when the load flanks of the male and female threads contact each other. The stabbing flank of the male thread is preferably chamfered.

16 Claims, 6 Drawing Sheets

U.S. PATENT DOCUMENTS

| | | |
|---|---|---|
| 6,698,802 B2 * | 3/2004 | Nagasaku et al. ............ 285/390 |
| 6,712,401 B2 * | 3/2004 | Coulon et al. ............... 285/331 |
| 7,255,374 B2 * | 8/2007 | Carcagno et al. ............ 285/333 |
| 7,331,614 B2 * | 2/2008 | Noel et al. .................. 285/334 |
| 7,334,821 B2 * | 2/2008 | Dutilleul et al. ............. 285/333 |
| 7,513,534 B2 * | 4/2009 | Noel et al. .................. 285/334 |
| 7,585,002 B2 * | 9/2009 | Curley et al. ................ 285/333 |
| 7,588,270 B2 * | 9/2009 | Durand et al. .............. 285/390 |

FOREIGN PATENT DOCUMENTS

| | | |
|---|---|---|
| JP | 09-273671 | 10/1997 |
| JP | 2001-124253 | 5/2001 |
| WO | WO 92/15815 | 9/1992 |
| WO | WO 2004/109173 | 12/2004 |

* cited by examiner

TUBULAR THREADED JOINT

This application is a Continuation of International Patent Application No. PCT/JP2007/057516, filed Mar. 28, 2007, and was published in English.

TECHNICAL FIELD

This invention relates to a tubular threaded joint suitable for use in connecting steel pipes such as oil country tubular goods (OCTG), riser pipes, and line pipes. More particularly, it relates to a tubular threaded joint which has excellent resistance to compression and which makes it easy to connect steel pipes in a vertical state in the field.

BACKGROUND ART

Steel pipes such as OCTG (oil country tubular goods including oil well tubing, casing, and drill pipes) used for the exploration and production of oil wells and gas wells, as well as riser pipes, line pipes, and the like are usually connected by a tubular threaded joint.

A tubular threaded joint is constituted by a pin, which is a male threaded element provided on an end portion of a first tubular member, and a box, which is a female threaded element provided on an end portion of a second tubular member. Connection is carried out by engagement of the male screw thread and the female screw thread, which are both tapered screw threads. Typically, the first tubular member is a pipe such as an oil country tubular good, and the second tubular member is a separate member in the form of a coupling (this type of tubular threaded joint is referred to as a coupling type). With this type, a pin is formed on both ends of the pipe, and a box is formed on both sides of the coupling.

There also exist integral-type tubular threaded joints which do not use a coupling and in which a pin is formed on the outer surface of one end of a pipe and a box is formed on the inner surface of the other end of the pipe. With this type, the first tubular member is a first pipe and the second tubular member is a second pipe. In theory, a coupling-type tubular threaded joint in which a pin is formed on a coupling and a box is formed on a pipe is also possible. Below, an explanation will be given primarily of an example of a tubular threaded joint of the type first described above in which a pin is formed on both ends of a pipe and a box is formed on a coupling.

In the past, oil country tubular goods have been connected primarily using standard threaded joints specified by API (American Petroleum Institute) standards. However, in recent years, as the environments for excavation and production of crude oil and natural gas become severe, high-performance special threaded joints referred to as premium joints are being increasingly used.

In a premium joint, the pin and the box each have, in addition to a tapered screw thread, a metal-to-metal seal surface, which makes direct metallic contact in the radial direction between mating members of the joint possible thereby forming a seal, and a torque shoulder surface which serves as an abutting stopper during tightening of the joint.

FIGS. 1(A) and 1(B) are schematic explanatory views of a typical premium joint for oil country tubular goods of the coupling type. FIG. 1(A) is an overall view, and FIG. 1(B) is an enlarged view of a portion thereof. As shown in FIG. 1(B), this tubular threaded joint has a pin 1 which is a male threaded element provided on each end portion of a pipe and a box 2 which is a corresponding female threaded element provided on both sides of a coupling. On its outer surface, the pin 1 has a tapered male threaded zone 11 and an unthreaded generally cylindrical abutting portion 12 called a lip (referred to below as a lip zone) adjacent to the male threaded zone 11 on the side closer to the end. The lip zone 12 has a metal-to-metal seal surface 13 (also referred to below simply as a seal surface) on its outer peripheral surface and a torque shoulder surface 14 (also referred to below simply as a shoulder surface) on its end surface.

The corresponding box 2 has on its inner surface a tapered female threaded zone 21, a metal-to-metal seal surface 23, and a shoulder surface 24 which can interfit with, contact, or abut against the tapered male threaded zone 11, the metal-to-metal seal surface 13, and the shoulder surface 14, respectively, of the pin 1.

FIG. 2 is a schematic view for explaining the shape and dimensions of a trapezoidal thread typified by a buttress thread specified by API. As in FIGS. 1(A) and 1(B), 11 is a male threaded zone and 21 is a female threaded zone. A screw thread used in a premium joint is usually a trapezoidal screw thread modeled on this API buttress screw thread. Most premium joints employ the dimensions of an API buttress screw thread with almost no changes with respect to the aspect ratio (height-to-width ratio), the flank angles (the angle of slope of the flanks), and the like of screw thread.

By way of example, in the case of an API buttress screw thread having a thread pitch of 5 TPI (5 threads per inch), the thread height 74, which is the height to the crest of a male thread, is 1.575 mm, the angle of slope 71 of the load flank is 3°, the angle of slope 72 of the stabbing flank is 10°, and the clearance 73 in the pipe axial direction between the stabbing flanks of the male screw thread and the female screw thread when the load flanks contact each other (the stabbing flank clearance) is an average of approximately 100 μm (30-180 μm).

Concerning the shape of the threads of a tubular threaded joint, WO 92/15815 describes a tubular threaded joint in which the portion connecting the thread crest and the stabbing flank of each thread of both a pin and a box is cut away along a straight line or a curve (namely, it is chamfered) such that it can function as a contact surface which is the first to contact when the pin is inserted into the box. The contact surfaces of the pin and the box are intended to contact each other to facilitate insertion when axial misalignment occurs during insertion of the pin into the box.

U.S. Pat. No. 6,322,110 discloses a tubular threaded joint based on the same concept. Namely, a corner chamfer (chamfer of a corner portion) is provided on the stabbing flanks of the threads of both a pin and a box. When the pin is inserted into the box, the corner chamfers engage with each other and facilitate insertion of the pin.

Above-described WO 92/15815 and U.S. Pat. No. 6,322,110 both facilitate insertion of a pin by preventing misalignment of the insertion angle by producing contact between the pin and the box in the chamfered portions of the stabbing flanks and the crests. Accordingly, chamfered portions are necessary on both the pin and the box, and the intended effect is not exhibited if they are provided on just one of the two members. There is no description in these patent documents concerning the effect of chamfering on resistance to compression.

In a premium joint, a certain amount of interference in the radial direction is provided between the metal-to-metal seal surfaces of a pin and a box. When a joint is tightened until the shoulder surfaces of the pin and the box abut against each other, the seal surfaces of these members are in intimate contact around the entire circumference of the joint, thereby forming a seal.

The shoulder surfaces of the pin and the box function as stoppers which abut at the time of tightening of the joint, and they also have the function of bearing a considerable proportion of the compressive load which acts on the joint. Accordingly, if the thickness of the shoulder surfaces is not large (or if the stiffness of the shoulder surfaces is not high), they cannot withstand a large compressive load.

In the past, vertical wells were predominant, and threaded joints for oil country tubular goods had sufficient performance if they could withstand the tensile load due to the weight of pipes connected thereto and could prevent leakage of high pressure fluid passing through their interior. However, in recent years, the depth of wells has been increasing, sloping wells and horizontal wells in which the well bore bends underground are increasing, and the development of wells in disadvantageous environments such as in the sea or in polar regions is increasing. As a result, a greater variety of performance is being demanded of threaded joints, such as resistance to compression, resistance to bending, sealing ability against external pressure, and ease of use or pin insertion in the field.

When external pressure acts on the above-described conventional premium joint, the applied external pressure is transmitted through gaps between the screw threads and penetrates to the portion just before the seal surfaces shown by 31 in FIG. 1(B). Since the lip zone has a much smaller wall thickness than the body of the pipes being connected, it sometimes undergoes deformation in the form of a reduction in diameter due to the penetrated external pressure. If the external pressure becomes high, a gap may develop between the seal surfaces, leading to the occurrence of leakage, e.g., a situation in which external fluid penetrates into the interior of the pipe body through the gap.

When a compressive load acts on a premium joint, for example, during installation of an oil country tubular good in a horizontal well or a sloping well, since a premium joint usually has a relatively large gap between the stabbing flanks as is the case with the above-described API buttress screw thread, the ability of the screw threads of the joint to bear a compressive load is low, and most of the compressive load is borne by the abutting shoulders thereof.

However, the wall thickness of the shoulder surfaces (the area for receiving compressive loads which corresponds to the area of the lip end surface) is normally considerably smaller than that of the pipe body. Therefore, if a compressive load corresponding to 40-60% of the yield strength of the pipe body is applied, with most premium joints, the lip zone of the pin undergoes a substantial plastic deformation, leading to a marked decrease in the sealing performance of the seal surface adjacent to this portion.

The sealing ability of a joint against external pressure (external pressure sealing ability) can be increased by increasing the stiffness of the pin so as to increase its resistance to deformation toward a reduction in diameter. For this purpose, a technique called swaging is often applied to the pipe towards the axis in order to increase the wall thickness of the lip zone.

However, if the amount of swaging is too great, with casing, there are cases in which a pipe which is inserted into its interior catches on the swaged portion, and with tubing, there are cases in which turbulence develops in a fluid such as crude oil flowing inside the tubing due to the swaged portion and causes erosion. Therefore, the wall thickness of a lip zone can be increased by swaging only to a limited extent.

WO 2004/109173 proposes a tubular threaded joint, as shown in FIG. 3, having a nose portion 15 provided between a metal-to-metal seal surface 13 and a torque shoulder surface 14 on the end surface of a pin 1. The generally cylindrical outer periphery of the nose portion 15 of the pin 1 does not contact the opposing is portion of the box 2. On the other hand, the metal-to-metal seal portions 13 and 23 and the shoulder surfaces 14 and 24 of the pin and the box contact each other. By extending the lip zone of the pin so as to provide a noncontacting nose portion 15 at the end of the seal surface, the wall thickness of the lip zone including the shoulder surface and the seal-surface can achieve a large value within a limited pipe wall thickness, and the resistance to compression and the sealing performance against external pressure of a tubular threaded joint can be markedly increased.

DISCLOSURE OF INVENTION

It is an object of the present invention to provide a tubular threaded joint which has excellent resistance to compression and which facilitates connection of pipes in the field while in a vertical state.

Other objects, advantages, and features of the present invention will be apparent from the following description.

In the tubular threaded joint proposed in above-described WO 2004/109173, an improvement in resistance to compression is achieved by modifying the portion closer to the end of the pin than the metal-to-metal seal surface. Upon repeated investigations on the basis of that tubular threaded joint, the present inventors found that if the shape of a thread, and particularly the stabbing flank clearance, which is the clearance in the pipe axial direction between the stabbing flanks of the male screw thread of the pin and the female screw thread of the box, and the length of the lip zone satisfy a certain relationship, plastic deformation of the lip zone due to compression is prevented from occurring, and the resistance to compression of a tubular threaded joint is further improved.

The present invention relates to a tubular threaded joint comprising a pin, which is a male threaded element formed on an end portion of a first tubular member, and a box, which is a female threaded element formed on an end portion of a second tubular member, wherein the pin and the box each have a threaded zone having a screw thread and at least one torque shoulder surface, the male thread in the to threaded zone of the pin engages with the female thread in the threaded zone of the box, the at least one torque shoulder surface of the pin abuts against the at least one torque shoulder surface of the box in the axial direction of the tubular joint, one of the contacting torque shoulder surfaces is an end shoulder surface constituting an end surface in the transverse direction of the tubular member, and the threads of the male threaded zone and the female threaded zone are generally trapezoidal threads which have a (thread) crest, a load flank, and a stabbing flank and which have a root separating thread flanks.

A tubular threaded joint according to the present invention is characterized in that the lip length of the member having an end shoulder surface, which is the axial distance between the end shoulder surface and the load flank of the closest engaged thread to the end shoulder surface, is at least 140 times and preferably at least 160 times the stabbing flank clearance, which is the axial clearance between the stabbing flank of male thread and the stabbing flank of female thread when the load flank of the male thread and the load flank of the female thread contact each other in the engaged male and female threads.

Some preferred embodiments of a tubular threaded joint according to the present invention include the following:

The stabbing flank clearance is at least 0.01 mm.
The stabbing flank clearance is at most 0.3 mm.

For the thread of at least one of the male and female threaded zones, the stabbing flank comprises a first portion on the root side and a second portion on the crest side and the second portion has a larger average angle of slope with respect to a line perpendicular to the longitudinal axis of the joint than the first portion.

The first portion of the stabbing flank is a surface substantially limited in longitudinal section by a straight line (like a generally conical surface), and the second portion thereof is a surface substantially limited in longitudinal section by a straight line, a bulging surface, or a concave surface.

The angle of slope of the first portion with respect to a line perpendicular to the longitudinal axis of the joint is in the range of 5-25°.

The average angle of slope of the second portion with respect to a line perpendicular to the longitudinal axis of the joint is in the range of 20-70°.

The thread of only one of the male and female threaded zones has a stabbing flank having the first and second portions, and the angle of slope with respect to a line perpendicular to the longitudinal axis of the first portion of the thread is the same as the angle of the stabbing flank of the thread of the other threaded zone.

The product of the height in the radial direction of the first portion of the stabbing flank and the developed thread length of the engaged threads in the threaded zones is larger than the difference between the nominal cross-sectional area of the bodies of the pipes being connected and the area of the abutting end shoulder surfaces of the joint.

The crest and the root of each thread are parallel to the longitudinal axis of the tubular threaded joint (and hence to the pipe axis).

The angle of slope of the load flanks of the engaged threads with respect to a line perpendicular to the longitudinal axis of the joint is in the range of −5° to +5°.

For the thread of at least one of the male and female threaded zones, the load flank of the thread comprises two portions in the form of a third portion on the root side and a fourth portion on the thread crest side, and the fourth portion has a larger average angle of slope with respect to a line perpendicular to the longitudinal axis of the joint than the third portion.

The fourth portion has either a surface substantially limited in longitudinal section by a straight line or a bulging surface.

Each of the pin and the box has a metal-to-metal seal surface between the shoulder surface and the threaded zone.

The metal-to-metal seal surface is provided in the vicinity of the threaded zone.

Each of the pin and the box has a noncontacting region in which the pin and box do not contact each other between the metal-to-metal seal surface and the shoulder surface.

According to the present invention, by extending the length of the lip zone, which is the distance in the member having a contacting end shoulder surface of a tubular threaded joint between the engaged threaded zone and the end shoulder surface, to at least 140 times and preferably at least 160 times the stabbing flank clearance of the male and female threads, resistance to compression is effectively conferred by the stabbing flanks of the threads (or by the remaining effective or engaged portions of the stabbing flanks when the upper portion of the stabbing flank of the pin or the box has been removed by chamfering or beveling), and the resistance to compression of a tubular threaded joint is increased.

By controlling the stabbing flank clearance to be within a certain range, variations in the tightening force at the time of tightening the threaded joint can be decreased. In addition, by suitably designing the shape of the threads and particularly the direction of the crest and the root, the shape of a stabbing flank and is the shape of the chamfer on the stabbing flank side, problems and misengagement of threads due to deviation of the insertion angle at the time of restricted tightening operation such as tightening operation in the field in a vertical state which is being increasingly automated can be decreased, thereby making such a tightening operation easy.

LIST OF REFERENCE NUMERALS

1: pin, 2: box, 11: male threaded zone, 12: lip zone, 13: metal-to-metal seal surface of pin, 14: end shoulder surface, 21: female threaded zone, 23: metal-to-metal seal surface of box, 24: shoulder surface of box, 71: load flank angle of thread, 72: stabbing flank angle of thread, 73: stabbing flank clearance of thread.

BEST MODE FOR CARRYING OUT THE INVENTION

A tubular threaded joint according to the present invention can be applied to either a coupling-type or an integral-type tubular threaded joint. In the case of a coupling type, typically a pin is formed on both ends of a pipe and a box is formed on both sides of a coupling, but it is possible to use the opposite combination.

Figure 4:
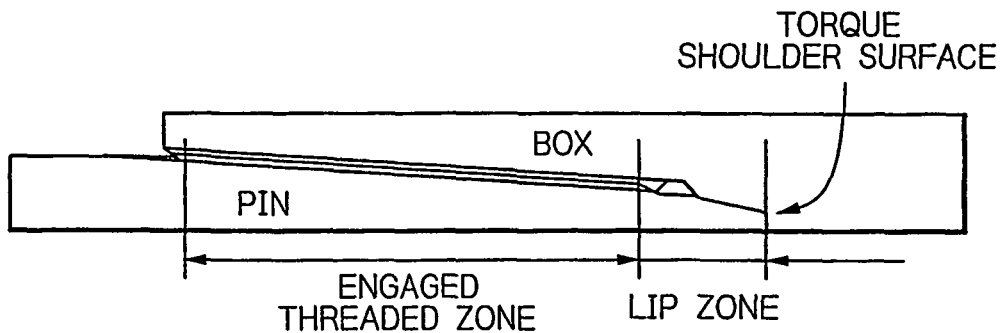
FIG. 4 is an overall explanatory view showing each portion of a tubular threaded joint.

The basic concept of a tubular threaded joint according to the present invention will be explained while referring to FIGS. 4 and 5. As shown by the schematic view in FIG. 4, in a usual tubular threaded joint, a pin has a threaded zone having a male screw thread which engages with an opposing female screw thread (an engaged thread zone in the figure), and a lip zone on the end side thereof which does not have engaged threads. The end surface in the transverse direction at the tip of the pin is an end shoulder surface functioning as a torque shoulder surface. Correspondingly, a box has on its outer end a threaded zone having a female screw thread which engages with the opposing male screw thread and, on the inner side thereof, a generally cylindrical surface which does not have engaged threads. The surface in the transverse direction of the innermost portion of the box is a torque shoulder surface which abuts against the end shoulder surface of the pin.

As shown in the figure, the shoulder surfaces of the pin and the box which abut against each other are in many cases an end shoulder surface of the pin and a corresponding innermost shoulder surface of the box. However, in the case of an integral-type joint, the surface area of the end surface of a pin having a male screw thread formed on the outer surface of one end of a pipe is sometimes smaller than the surface area of the end surface of a box having a female screw thread formed on the other end of the pipe. In such a case, it is advantageous to use the end surface of a box as a torque shoulder surface since the resistance to compression can be increased.

Thus, in the present invention, the lip zone means the portion of a threaded joint member (a pin or a box) having an end shoulder surface (which functions as a torque shoulder surface at the time of tightening of the threaded joint) which is located closer to the end of the joint member than the engaged thread portion thereof.

Figure 1:
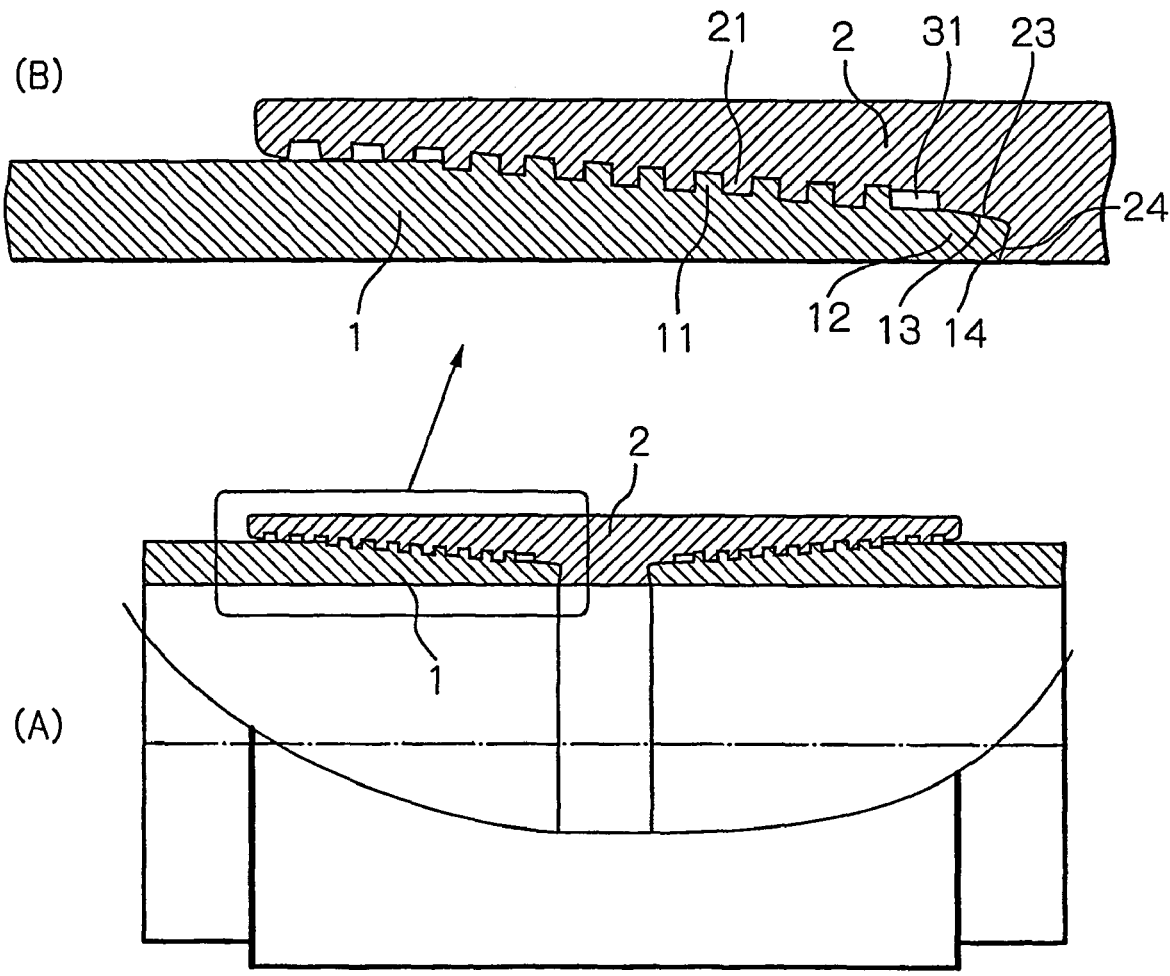
FIG. 1(A) is a schematic explanatory view of a typical conventional tubular threaded joint of the coupling type referred to as a premium joint.
FIG. 1(B) is an enlarged view of a portion thereof.
Figure 3:
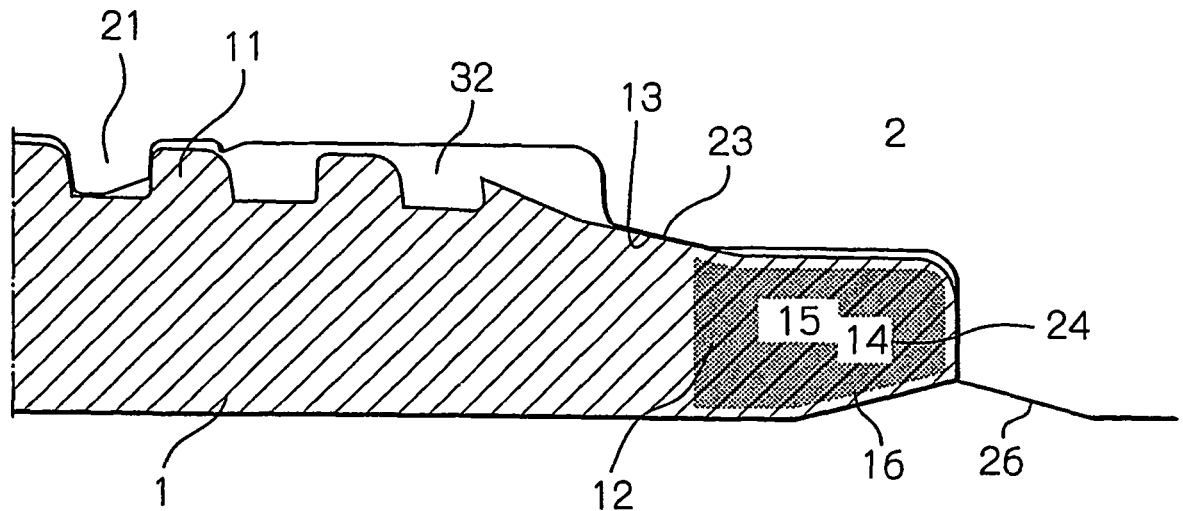
FIG. 3 is a schematic explanatory view of a tubular threaded joint suitable for application of the present invention in which a lip zone is extended and a non-contacting region is provided at the end of a metal-to-metal seal surface.

The screw threads of the threaded zones of the pin and the box engage with each other. However, it is not necessary for the threads to engage along the entire length. As shown in FIG. 1 (B), the end portions of the screw thread of one or both members and particularly the screw thread in the vicinity of the tip of the box need not be engaged with screw thread of the other member. In addition, as shown in FIG. 3, an unengaged male thread can be added to a portion of the outer surface of the pin between the engaged threaded zone and the lip zone. By doing so, the stiffness of the pin against external pressure can be increased. In the present invention, the unengaged thread formed on the outer end (closer to the tip) of the threaded zone of a member (pin or box) having an end shoulder surface are included within the lip zone of the member.

Although it is not essential in the present invention, typically, a tubular threaded joint has a metal-to-metal seal portion. For example, the outer surface of the lip zone of a pin and the unthreaded generally cylindrical inner surface of a box have a portion in which they contact each other to form metal-to-metal seal surfaces 13 and 23, as shown in FIG. 3. From the standpoint of improving the resistance to compression of the lip zone, the metal-to-metal seal surfaces are preferably provided in a region of the lip zone which is close to the threaded zone, as illustrated. Again although not essential in the present invention, as shown in FIG. 3, a noncontacting region where the generally cylindrical surfaces of the pin and box do not contact each other is preferably provided in the lip zone at a location between the metal-to-metal seal surfaces 13, 23 and the shoulder surfaces 14, 24. As described in WO 2004/109173, the noncontacting region in the lip zone can further increase the resistance to compression of that portion. In addition, as shown in FIG. 3, the inner surfaces of the pin and the box on both sides of the shoulder surfaces can be removed to form chamfered portions 16 and 26. As a result, circularity of the interior of the pipe around the abutting shoulder surfaces can be achieved so that the occurrence of turbulence of fluid flowing through the joint can be prevented.

Figure 5:
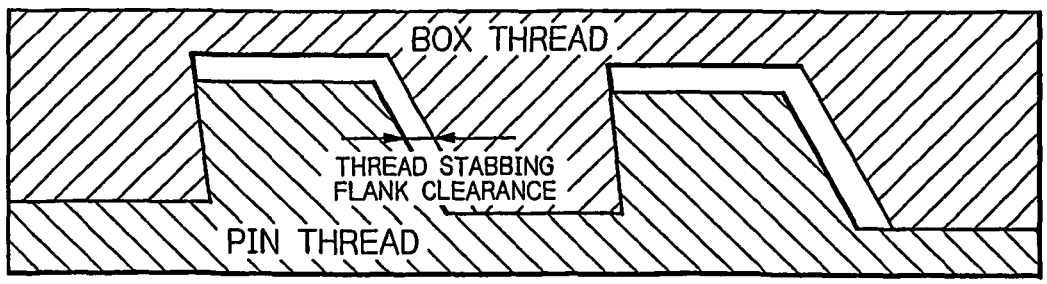
FIG. 5 is an explanatory view showing the longitudinal (axial) sectional shape of the threaded zones of the pin and box of a tubular threaded joint.

FIG. 5 schematically shows threads of a tubular threaded joint in longitudinal section of the joint. For ease of explanation, all the corners of the threads shown therein are not chamfered at all. As already explained with respect to FIG. 2, each of the engaged threads of the pin and the box has a crest, a load flank which is the thread flank on the rear side in the direction of insertion of the pin, and a stabbing flank which is the thread flank on the front side in the direction of insertion of the pin, and adjacent thread flanks are separated by a root. As shown in FIG. 5, in a state in which the load flanks of the male screw thread of the pin and the female screw thread of the box contact (bear against) each other, the clearance in the longitudinal (axial) direction between the stabbing flanks of the male screw thread and the female screw thread is the (thread) stabbing flank clearance. As shown in the figure, there is also a clearance between the crest of the male screw thread and the root of the female screw thread. These clearances are necessary so that threaded engagement can be carried out without producing galling.

FIG. 5 shows an example in which the stabbing flanks of the male screw thread and the female screw thread are parallel so that the stabbing flank clearance is uniform over the entirety of the stabbing flanks of the engaged threads.

In the present invention, in a member (pin or box) which has an end shoulder surface, the distance in the axial (longitudinal) direction of the member between the end shoulder surface and the load flank of the engaged thread located closest to the end shoulder surface (this distance substantially corresponds to the length of the lip zone, so below it will be referred to as the lip length) is at least 140 times and preferably at least 160 times the stabbing flank clearance. As shown in FIG. 3, when the threaded zone (the threaded zone of the pin in the illustrated example) has unengaged threads on its end portion closest to the shoulder surface 14, the axial length of this unengaged thread portion, namely, the axial length of a cylindrical groove 32 provided on a box 2 in FIG. 3, is included in the lip length.

As stated above, a member having an end shoulder surface which abuts against an opposing innermost shoulder surface of the other member of a tubular threaded joint is typically a pin. In this case, the lip length of the pin satisfies the above-described requirements with respect to the stabbing flank clearance. However, as stated above, particularly with an integral-type tubular threaded joint, this end shoulder surface is sometimes provided on the box. In this case, the lip length of the box is made to satisfy the above-described requirement. When both the pin and box of a threaded joint have an end shoulder surface and hence a lip zone, at least one of the lip lengths of the pin and the box is made to satisfy the requirement.

Under a compressive load, it is necessary in a tubular threaded joint that the threads act in compression while the strain of the lip zone remains in the elastic region. If the lip length is at least 140 times and preferably at least 160 times the stabbing flank clearance, even if a threaded joint undergoes compression in the pipe axial direction due to external pressure, the lip zone does not begin to undergo plastic deformation, and the stabbing flanks of the threads can contribute to resistance to compression while the strain of the lip zone remains in the state of elastic deformation. As a result, the resistance to compression of a tubular threaded joint is markedly increased.

The stabbing flank clearance is preferably at least 0.01 mm (10 μm) and at most 0.3 mm (300 μm). If the stabbing flank clearance is smaller than 0.01 mm, the clearance is so small that tightening of a threaded joint becomes unstable, and it becomes easy for galling to occur. On the other hand, if the stabbing flank clearance is larger than 0.3 mm, the clearance is so large as to allow external pressure to easily penetrate, thereby unduly increasing the external pressure to be applied to the lip zone during tightening. As shown in FIG. 5, there is also a clearance in the radial direction of the joint between the crest of a male thread and the root of a female thread engaged therewith. There is no particular limitation on the dimension of this clearance in the radial direction, but normally it is designed so that a sufficient clearance can be achieved taking into consideration the tolerances of the thread height.

For the thread of at least one of the pin and the box (preferably the male thread of the pin, as shown in FIGS. 6-9), the stabbing flank of each thread comprises two portions in the form of a first portion on the root side and a second portion on the crest side. The second portion preferably has a larger average angle of slope with respect to a line perpendicular to the longitudinal axis than the first portion (namely, the second portion has a steeper slope than the first portion). As a result, as next explained, tightening of the threaded joint in the field can be made easier while maintaining sufficient resistance to compression.

In general, the overall thread height in the engaged threaded zone of a tubular threaded joint (the height in the radial direction from the root to the crest of a thread) is designed so that the strength of the joint is at least the strength of the pipe body under a tensile load. Under a compressive load, the abutting shoulder surfaces also receive the applied load. Accordingly, the compressive load borne by the threads is reduced by the amount received by the cross-sectional area of the abutting shoulder surfaces. Namely, the thread height necessary for supporting a load is smaller under a compressive load than under a tensile load. A tensile load is borne by the load flanks of the engaged threads of a joint in the state shown in FIG. 5 in which the load flanks contact each other, while a compressive load is borne by the stabbing flanks of the engaged threads in an unshown state in which the stabbing flanks contact each other. Therefore, the thread height on the stabbing flank side of the threads includes a margin.

In a tubular threaded joint having abutting shoulder surfaces and engaged threads which both contribute to resistance to compression or receive a compressive load, the compression rate of the joint can be expressed by the ratio of the total cross-sectional area in the transverse or radial direction of the compression-receiving surfaces of the joint to the radial cross-sectional area of the pipe body, which is given by the following equation.

Compression rate (%)={[(cumulative projected cross-sectional area of engaged threads)+(cross-sectional area of abutting shoulder surfaces)]/(cross-sectional area of pipe body)}×100.

The cross-sectional area of abutting shoulder surfaces is typically about 40-50% of that of pipe body. Therefore, even with a compression rate of 100% in which a compressive load corresponding to the yield strength of the pipe body is applied to a tubular threaded joint, the joint can withstand the compressive load if the thread height of the stabbing flanks is at least 50-60% of the overall thread height. Accordingly, if the first portion on the root side of the stabbing flanks has at least the height necessary to support a compressive load (such as 50-60% of the overall thread height), the remaining second portion on the crest side of the stabbing flanks may have a larger angle of slope, which makes the portion unable to receive a compressive load, and even in this case, a sufficient resistance to compression can be achieved.

Concerning the resistance to compression of a tubular threaded joint, from in the past, plastic deformation of the end shoulder surface disposed at the end of the lip zone was thought to be a major cause of a loss of resistance to compression, so the ratio of the cross-sectional area of the shoulder area to the cross-sectional area of the pipe body is an important factor. In the present invention, initial contact of the thread stabbing flanks takes place when deformation of the lip zone remains in the elastic region, so resistance to compression of a tubular threaded joint is controlled by the sum of the cross-sectional area of the abutting shoulder portions and the cumulative projected cross-sectional area of the engaged (effective) thread stabbing flanks, which correspond to the above-described first portion of the stabbing flank. The height of the first portion which contributes to compression rate in the thread stabbing flanks can be determined in this manner.

The height in the radial direction of the first portion of the chamfered stabbing flank of the male thread of the pin, for example, is preferably set such that the product of the height in the radial direction of this first portion and the developed thread length of the engaged threads (pin and box screw threads engaged with each other) is larger than the difference between the nominal radial cross-sectional area of the body of the pipes being connected and the radial cross-sectional area of the abutting shoulder surfaces of the joint. By doing so, the joint can have resistance to compression which can withstand a compressive load corresponding to the above-mentioned 100% compression rate. The cross-sectional area of the pipe body of course means the cross-sectional area in the radial direction of the wall of the pipe. When a threaded joint has abutting shoulder surfaces in two or more locations, the cross-sectional area of the abutting shoulder surfaces is the sum of the cross-sectional areas at the two or more locations.

By giving the second portion of the stabbing flank a chamfered shape which is optimal from the standpoint of tightening operation in the field, it is possible to realize an easy tightening operation in the field while maintaining excellent resistance to compression achieved by the first portion.

The first portion of the stabbing flank of the screw thread of a member (e.g., a pin) should be parallel to the stabbing flank of the screw thread of the other member so as to make a uniform stabbing flank clearance in the first portion and allow the first portion of the stabbing flank to uniformly contact the stabbing flank of the other screw thread at the time of tightening the joint. Accordingly, the first portion of the stabbing flank of the screw thread and the stabbing flank of the other screw thread are preferably generally conical surfaces.

Here, a generally conical surface means a surface substantially limited in longitudinal section (along the pipe axis) by a straight line. More specifically, it means that at least 50% and preferably at least 80% of the height is conical or is limited in longitudinal section by a straight line. Thus, a generally conical surface includes the case in which the upper end and/or the lower end is slightly rounded.

Figure 6:
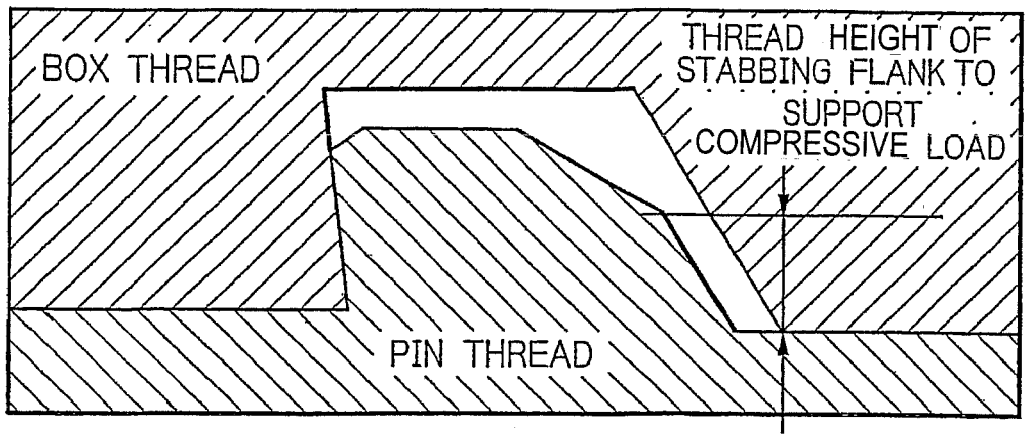
FIG. 6 is an explanatory view showing an embodiment in which the stabbing flank of a male thread of a pin have two portions with different angles of slope.
Figure 7:
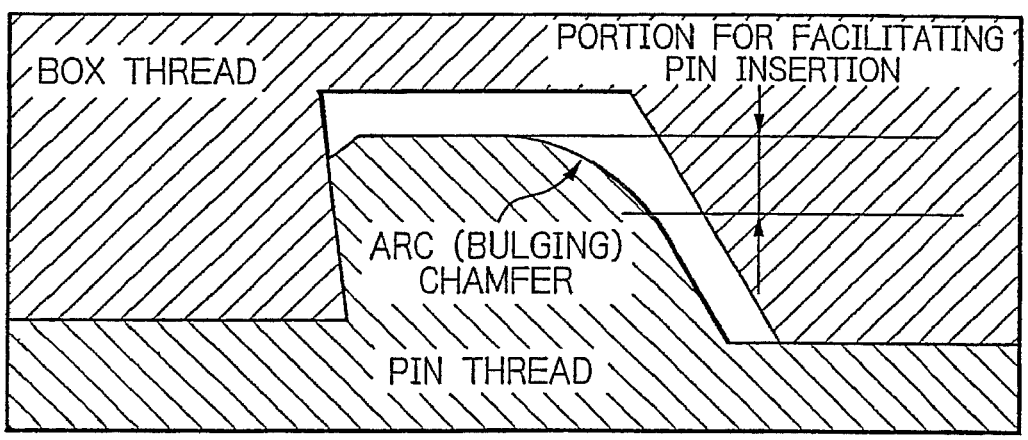
FIG. 7 is an explanatory view showing a variation of the embodiment shown in FIG. 6.

The second portion of a stabbing flank having a larger angle of slope is a chamfered portion. This chamfering makes it easy to insert a pin into a box at the time of tightening in the field. As shown in FIG. 6, a chamfer of the second portion may be a chamfer such that the cross section in the pipe axial direction is linear (a chamfer with a generally conical surface), or as shown in FIG. 7, it may be a chamfer such that the axial cross section is arcuate (a convex bulging surface or a concave surface). FIG. 7 shows an example of a bulging surface. It is also possible for a chamfer to combine these shapes.

Figure 8:
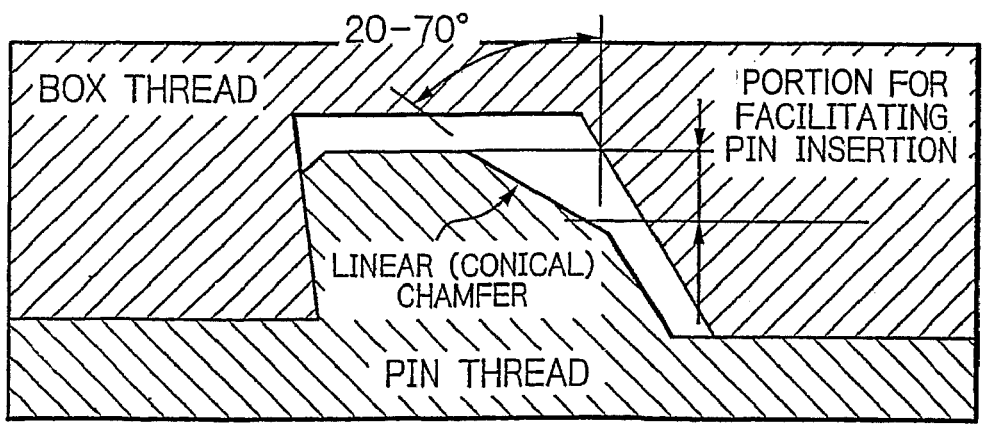
FIG. 8 is an explanatory view of an embodiment similar to FIG. 6.

When the first portion of a stabbing flank has a generally conical shape, the angle of slope of the surface with respect to a line perpendicular to the pipe axis (the longitudinal axis of the pipe and joint) is preferably in the range of 5-25°. Regardless of the chamfered shape of the second portion which is a chamfered portion, the average angle of slope of the second portion with respect to a line perpendicular to the pipe axis is preferably in the range of 20-70°, as shown in FIG. 8.

In the tubular threaded joints described in above-mentioned WO 92/15815 and U.S. Pat. No. 6,322,110, not only is the stabbing flank of a male thread chamfered in the vicinity of the crest, but a corresponding shape is imparted to the opposing portion of a female screw thread. Accordingly, each female screw thread also has two portions with different angles of slope. In the present invention, as shown in FIGS. 6-8, it is not necessary to impart a shape corresponding to the chamfer of the male screw thread to the stabbing flank of the female screw thread.

The crests and roots of the screw threads are preferably parallel to the pipe axial direction for all the male and female threads. Namely, although the threaded zones of the pin and the box of a tubular threaded joint are in the form of tapered screw threads, it is preferable that the crest and root of each thread not be parallel to the tapered slope but be parallel to the pipe axis. In this manner, problems due to deviation of the insertion angle of a pin at the time of tightening operation in the field are reduced.

The angle with respect to a line perpendicular to the pipe axis of the load flanks of the threads of the pin and the box is preferably in the range of −5° to +5°. Here, when the angle of slope of a load flank is negative, it means, as shown in FIGS. 5-9, for example, that the load flank is leaning leftwards in the figures with respect to a line perpendicular to the pipe axis.

Figure 9:
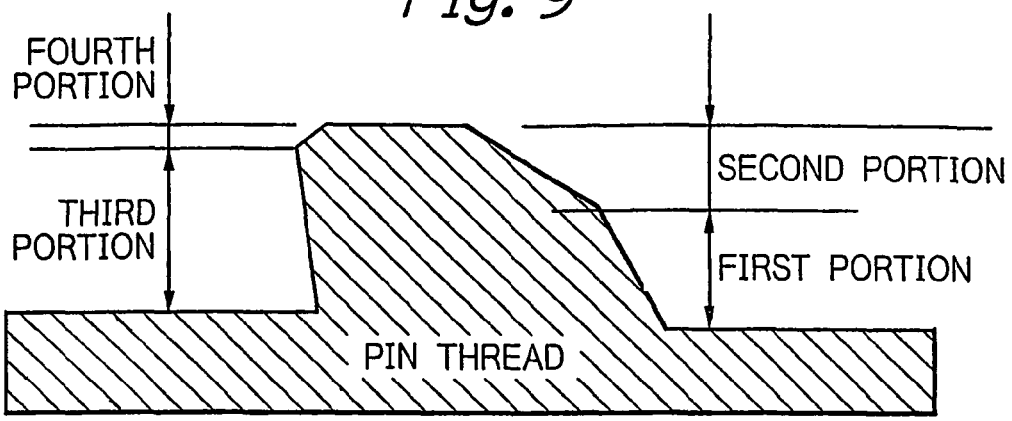
FIG. 9 is an explanatory view of each portion of a stabbing flank and a load flank of a pin (male) thread of an embodiment similar to FIG. 6.

The load flank of the thread of at least one of the pin and the box and preferably of the male thread of the pin may also comprise two portions in the form of a third portion on the root side and a fourth portion on the crest side, as shown in FIGS. 6-9 and particularly in FIG. 9. The fourth portion should have a larger average angle of slope (on the plus side) with respect to a line perpendicular to the pipe axis than the third portion. In this case, the third portion of the load flank is preferably a generally conical surface, and its angle of slope is preferably in the range of −5° to +5°. The fourth portion may be a generally conical surface as shown in the figure, or it may be a bulging surface.

The fourth portion of a load flank is also a kind of chamfer which makes it easy to insert a pin into a box at the time of tightening in the field. A tensile load is borne only by the load flanks, and there is no contribution by the shoulder surfaces to resisting tensile force. Therefore, it is necessary to make the area of the contact portions of the male thread and the female thread larger for the load flanks (the third portion thereof) than for the stabbing flanks (the first portion thereof). Thus, it is preferred that the fourth portion of a load flank have a smaller height than the second portion of a stabbing flank so that an adequate area for contact is left in the third portion of the load flank which contributes to tensile performance. For this reason, the height of the fourth portion is preferably at most 20% of the thread height.

Both the pin and the box preferably have a metal-to-metal seal surface between the shoulder surface and the engaged thread portion, i.e., in the lip zone. In the present invention, the lip length is at least 140 times the stabbing flank clearance of the thread, which is considerably longer compared to a conventional one. In this case, if the metal-to-metal seal surface is provided over the entire length of the lip zone, it becomes easy for galling to occur during tightening operation. Therefore, the metal-to-metal seal surface is provided over a portion of the lip zone and preferably in a region thereof close to the threaded zone. The length of the metal-to-metal seal portion is preferably at most 25% of the lip length.

The pin and the box each preferably have a noncontacting region (where they do not contact each other) between the metal-to-metal seal surface and the shoulder surface. By providing such a noncontacting region between the metal-to-metal seal surface and the shoulder surface, the length of the lip zone can be increased, and at the time of application of a compressive load, it becomes possible for the compressive load to be supported by the contacting stabbing flanks of the threaded zones of the pin and the box and the abutting shoulder surfaces while the strain of the lip zone remains in the elastic region, and the lip zone including the metal-to-metal seal surface takes on a design which is resistant to plastic deformation due to compression.

This noncontacting region may be a portion in which either the pin or the box does not have threads as shown in FIG. 3, or it may be an unengaged thread portion in which only one member of the pin and box has threads, or it may include both portions. The length of this noncontacting region is preferably at least 15% of the lip length. The length of a portion of a noncontacting region which does not have threads in either member is preferably at most 33% of the lip length.

Figure 10:
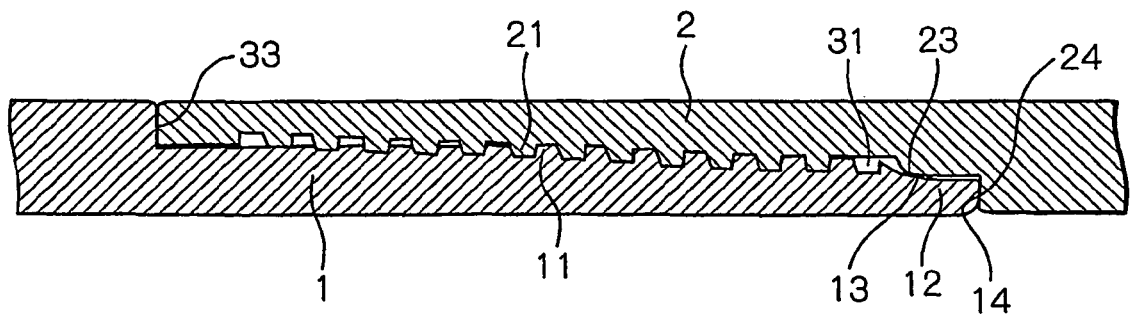
FIG. 10 is a schematic longitudinal sectional view of an embodiment in which a second shoulder surface is provided on the end surface of a box.
Figure 11:
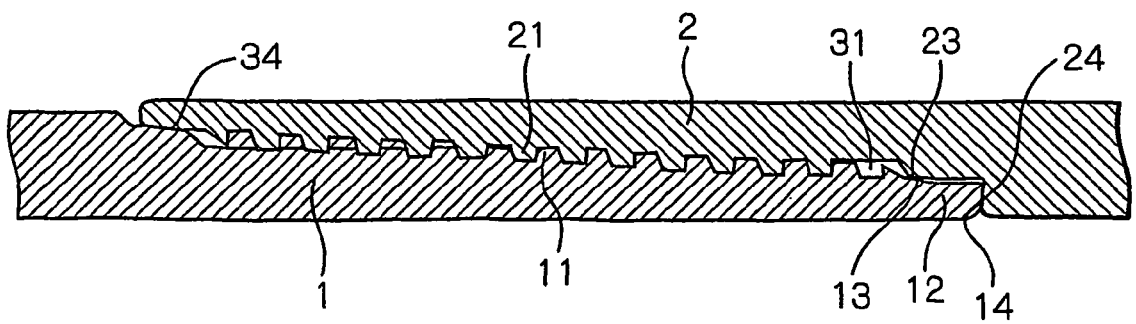
FIG. 11 is a schematic longitudinal sectional view of another embodiment in which a second metal-to-metal seal surface is provided on the end portion of a box.
Figure 12:
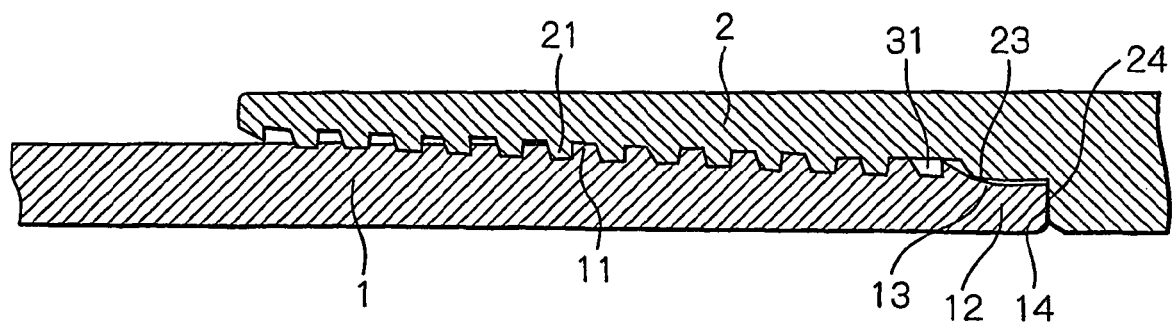
FIG. 12 is a schematic view showing an embodiment in which a pin member is given an increased wall thickness toward its end by swaging.

Other than the above-described relationship between the stabbing flank clearance and the lip length and the preferred shape of the stabbing flank and the load flank of the engaged thread of at least one member and preferably of the pin, there are no particular restrictions on the shape or structure of a tubular threaded joint. For example, an end shoulder surface and a metal-to-metal seal surface are not limited to one location, and as shown in FIG. 10, a second end shoulder surface 33 can be provided at the tip end of the box 2, or as shown in FIG. 11, a second metal-to-metal seal surfaces 34 can be provided on both members near the tip end of the box 2. In addition, as shown in FIG. 12, the thicknesses of a pipe and/or a coupling can be increased in the vicinity of the joint portion by swaging or overlaying.

In particular, as shown in FIG. 10, when a lip zone having an end shoulder surface is provided at the tip end of each of the box and the pin, or in other words, when a tubular threaded joint has two lip zones each having an end shoulder surface which functions as a torque shoulder surface at the time of tightening of the joint, the relationship between the lip length and the stabbing flank clearance specified by the present invention should be satisfied for at least one lip zone.

The following examples are presented to further illustrate the present invention. These examples are to be considered in all respects as illustrative and not restrictive.

EXAMPLE 1

In order to clearly demonstrate the effects of the present invention, a compressive load was applied to the test members shown in Table 1 by tightening, and deformation of the lip zone was observed.

Each of the test members shown in Table 1 was a threaded joint for oil country tubular goods of the coupling type like that shown in FIG. 3. They were for use with respect to a 9.625"×53.5 (lb/ft) steel pipe (outer diameter of 244.5 mm and wall thickness of 13.84 mm). The steel used for all of the test members was that specified by API specification P110. The shoulder surfaces were an end shoulder surface located at the end of the pin and a corresponding shoulder surface of the box. The lip zone had on its outer periphery a metal-to-metal seal surface (length of 5.5 mm) in the vicinity of the threaded zone and a noncontacting region on the outer end side thereof.

In contrast to FIG. 3, there was no unengaged thread on the end portion of the threaded zone.

Figure 2:
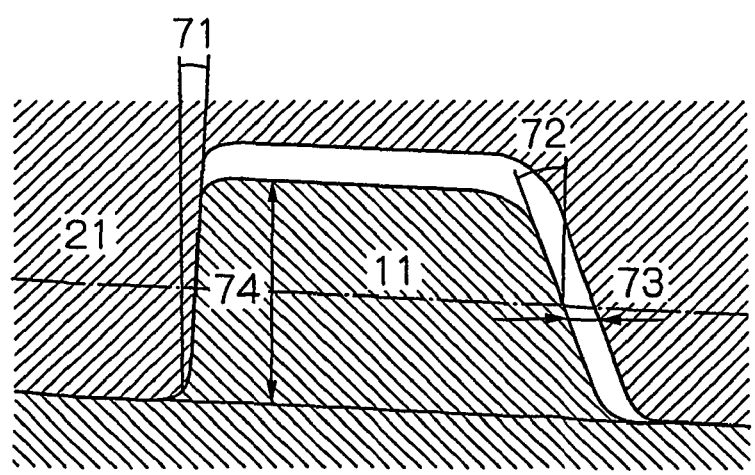
FIG. 2 is a schematic view for explaining the shape and dimensions of a trapezoidal thread typified by an API buttress thread.

The screw thread shape was the same for all the test members, with a taper of ⅟₁₈, a male thread height 74 of 1.3 mm, a thread pitch of 5.08 mm, a stabbing flank angle 72 of 10°, and a load flank angle 71 of −3°. A chamfer of the stabbing flanks and the load flanks for both the male screw thread and the female screw thread was only a minimal rounding as shown in FIG. 2, and the stabbing flanks consisted essentially of only one portion. The stabbing flank clearance 73 and the length of the lip zone of the joint were varied as shown in Table 1.

For each of the test members, tightening of the joint was terminated immediately after the shoulder surfaces of the pin and the box abutted against each other. The results are shown in Table 1 and FIG. 13.

slope of the stabbing flank was 10° for the first portion and 45° for the second portion. The ratio of the lip length to the stabbing flank clearance was 200 (the stabbing flank clearance was 0.1 mm and the lip length was 20 mm). By varying the height of the first portion of the stabbing flank, the ratio of the height of the first portion with respect to the overall thread height (the thread stabbing flank height ratio in Table 2) was varied as shown in Table 2. In addition, by varying the diameter of the end portion of the lip zone, i.e., the area of the end shoulder surface of the pin, the ratio of the cross-sectional area of the abutting shoulder surfaces and that of the cumulative cross-sectional area of engaged (effective) stabbing flanks (=the product of the thread height of the first portion of the stabbing flank of the male thread and the developed thread

TABLE 1

| Lip length (A) (mm) | Stabbing flank clearance (B) (mm) | A/B | \multicolumn{7}{c}{Level of compressive load applied (% with respect to yield strength of pipe body)*} | | | | | | |
|---|---|---|---|---|---|---|---|---|---|
| | | | 40% | 50% | 60% | 70% | 80% | 90% | 100% |
| 15 | 0.10 | 150 | ○ | ○ | ○ | ○ | ○ | ○ | ○ |
| 15 | 0.15 | 100 | ○ | ○ | ○ | X | X | X | X |
| 15 | 0.20 | 75 | ○ | X | X | X | X | X | X |
| 20 | 0.10 | 200 | ○ | ○ | ○ | ○ | ○ | ○ | ○ |
| 20 | 0.15 | 133 | ○ | ○ | ○ | ○ | ○ | ○ | X |
| 20 | 0.20 | 100 | ○ | ○ | ○ | X | X | X | X |
| 25 | 0.10 | 250 | ○ | ○ | ○ | ○ | ○ | ○ | ○ |
| 25 | 0.15 | 167 | ○ | ○ | ○ | ○ | ○ | ○ | ○ |
| 25 | 0.20 | 125 | ○ | ○ | ○ | ○ | ○ | X | X |

*○: no plastic deformation of lip after application of compressive load;
X: plastic deformation occurred.

Figure 13:
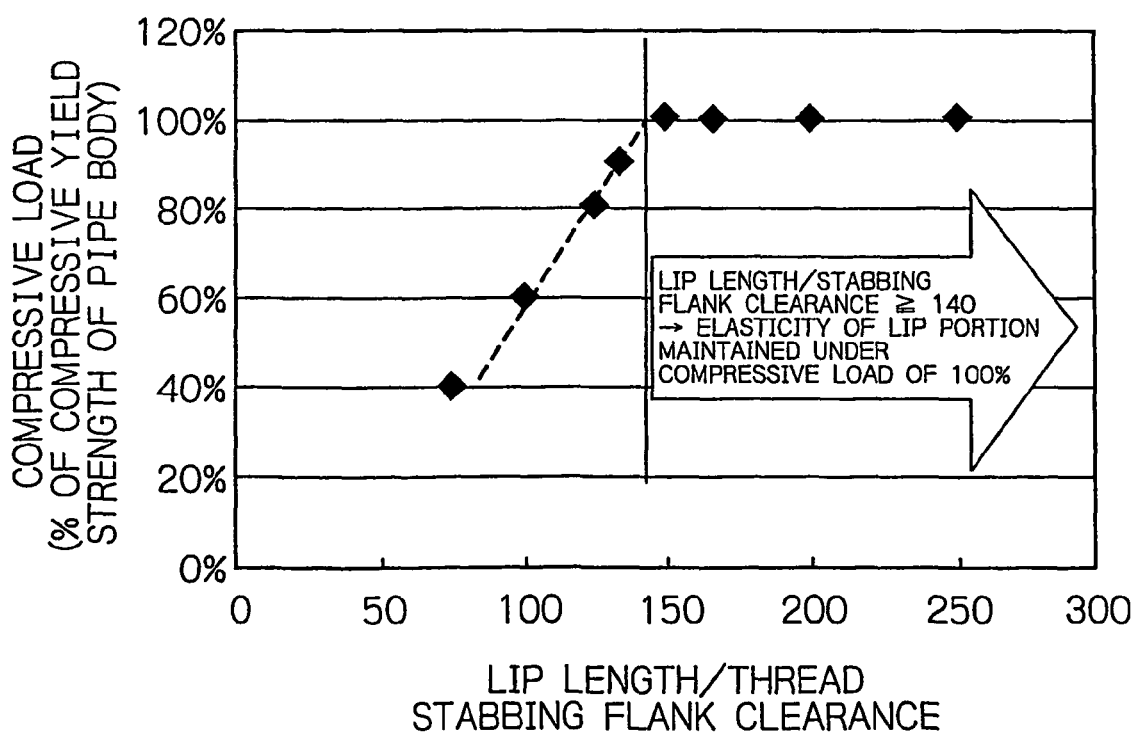
FIG. 13 is a graph showing the results of an example.

As can be seen from the results in Table 1 and FIG. 13, if the requirement of the present invention that the lip length be at least 140 times the stabbing flank clearance is satisfied, even when a compressive force corresponding to 100% of the yield strength of the pipe body is applied, plastic deformation of the lip zone does not occur and only elastic deformation takes place, so the resistance to compression is excellent.

EXAMPLE 2

An evaluation test was carried out in the same manner as in Example 1, but in this example, the stabbing flank of the male thread of the pin was divided into a first portion on the root side and a second portion on the crest side having different slope angles. In this example, in order to simplify analysis, as shown in FIGS. 6 and 8, the first portion and the second portion of the stabbing flanks were both made conical surfaces (namely, having a longitudinal section along the pipe axis substantially formed by a straight line). The angle of length of the engaged thread) with respect to the cross-sectional area of the pipe body was varied as shown in the column of cross-sectional area ratio in Table 2. In this table, for conditions 7, 8, and 9, the pin end was subjected to swaging so as to have an increased wall thickness and hence an increased cross-sectional area of the end shoulder portion at its end.

Analysis was carried out by evaluating the condition of the lip zone (whether there was deformation or breakage) after a compressive load corresponding to 100% of the yield strength of the pipe body (namely, an elastic compression rate calculated by the above-described formula) and an external pressure specified by API were applied. The results are shown in Table 2 and FIG. 14. In Table 2, the cross-sectional area of the abutting shoulder surfaces and the cumulative cross-sectional area of engaged stabbing flanks are shown as the ratio (%) with respect to the nominal cross-sectional area of the bodies of the pipes being connected by the threaded joint, which is taken as 100%.

TABLE 2

| Condition | Cross-sectional area ratio (vs cross-sectional area of pipe body) | | Ratio of stabbing flank height (vs overall thread height) | Level of compressive load applied (vs yield strength of pipe body) | Applied external pressure | (Lip length)/ (stabbing flank clearance of threads) | Occurrence of breakage |
|---|---|---|---|---|---|---|---|
| | Abutting shoulder surfaces | Cumulative engaged stabbing flanks | | | | | |
| 1 | 30% | 91% | 76% | 100% | API 5C3 | 200 | no breakage |
| 2 | 30% | 80% | 57% | 100% | API 5C3 | 200 | no breakage |
| 3 | 30% | 48% | 35% | 100% | API 5C3 | 200 | lip deformation |
| 4 | 40% | 76% | 76% | 100% | API 5C3 | 200 | no breakage |
| 5 | 40% | 70% | 57% | 100% | API 5C3 | 200 | no breakage |

TABLE 2-continued

| | Cross-sectional area ratio (vs cross-sectional area of pipe body) | | Ratio of stabbing flank height (vs overall thread height) | Level of compressive load applied (vs yield strength of pipe body) | Applied external pressure | (Lip length)/ (stabbing flank clearance of threads) | Occurrence of breakage |
|---|---|---|---|---|---|---|---|
| Condition | Abutting shoulder surfaces | Cumulative engaged stabbing flanks | | | | | |
| 6 | 40% | 48% | 35% | 100% | API 5C3 | 200 | lip deformation |
| 7 | 50% | 76% | 76% | 100% | API 5C3 | 200 | no breakage |
| 8 | 50% | 70% | 57% | 100% | API 5C3 | 200 | no breakage |
| 9 | 50% | 48% | 35% | 100% | API 5C3 | 200 | lip deformation |

Figure 14:
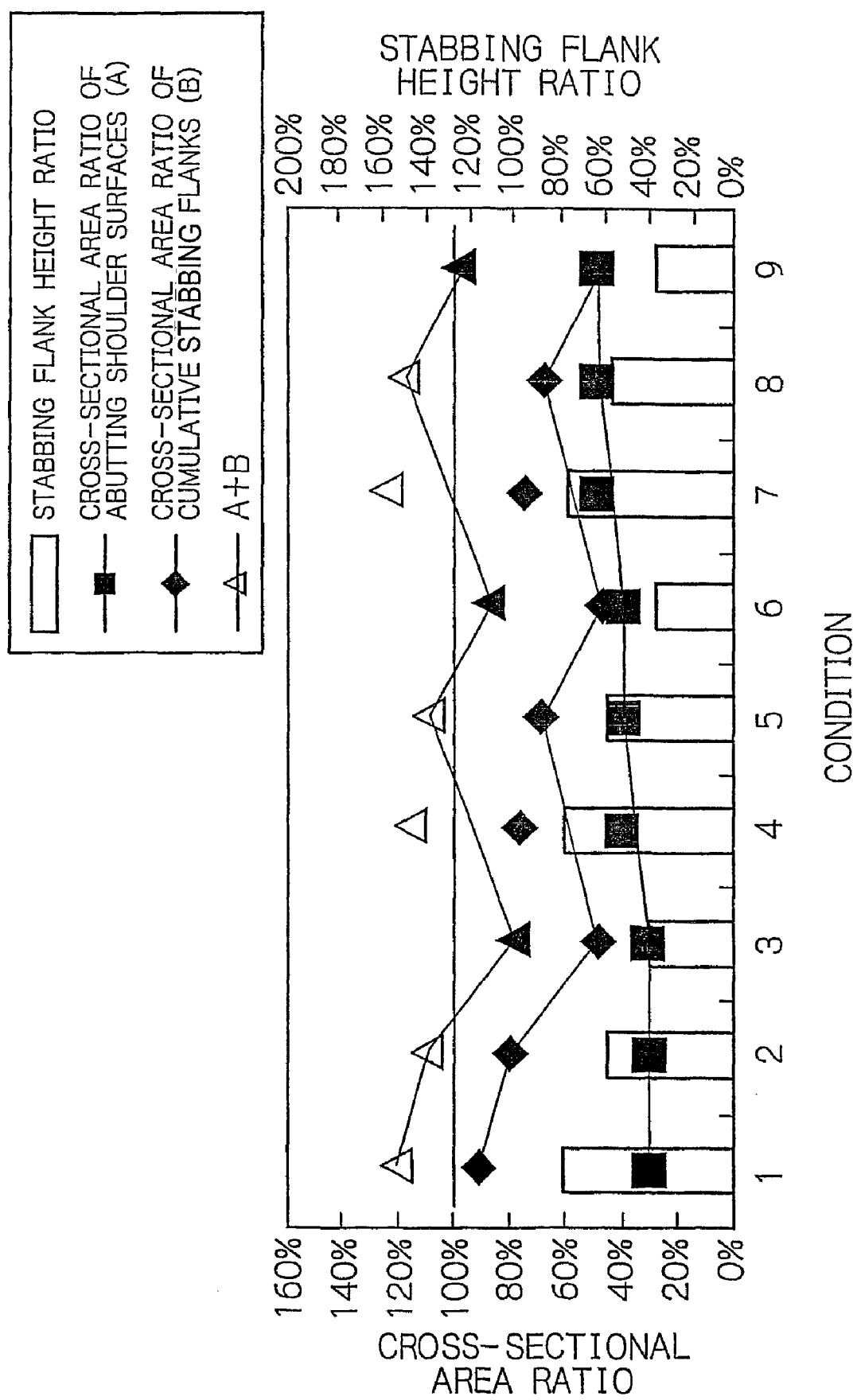
FIG. 14 is a graph showing the results of another example.

As can be seen from Table 2 and FIG. 14, when the cumulative cross-sectional area of engaged stabbing flanks of the threads was larger than the difference between the nominal cross-sectional area of the pipe body (100%) and the cross-sectional area of the end shoulder surface, i.e., when the following relationship was satisfied, the resistance to compression of the threaded joint exceeded the resistance to compression of the pipe bodies, and as a result, the lip zone did not deform.

[Cumulative cross-sectional area of engaged stabbing flanks]>[nominal cross-sectional area of pipe body]−[cross-sectional area of abutting shoulder surfaces]

Although the present invention has been explained with respect to preferred embodiments, these embodiments are merely examples and do not restrict the present invention. It is clear to those skilled in the art that the above embodiments can be modified in various ways without departing from the scope of the present invention as described by the claims.

The invention claimed is:

1. A tubular threaded joint comprising a pin which is a male threaded element formed on an end portion of a first tubular member and a box which is a female threaded element formed on an end portion of a second tubular member, the pin and the box each having a threaded zone and at least one torque shoulder surface, the male threaded zone of the pin engaging with the female threaded zone of the box, the at least one torque shoulder surface of the pin abutting against the at least one torque shoulder surface of the box in the axial direction of the pipe, one of the abutting torque shoulder surfaces being an end shoulder surface constituting an end surface in the transverse direction of the member, the threads of the male threaded zone and the female threaded zone being generally trapezoidal threads which have a thread crest, a load flank, and a stabbing flank and which have a root separating the thread, characterized in that the lip length of the member having an end shoulder surface, which is the axial distance between the end shoulder surface and the load flank of the closest engaged thread to the end shoulder surface, is at least 140 times the stabbing flank clearance, which is the axial distance of the clearance between the stabbing flanks of the male thread and the female thread when the load flank of the male threads and that of the female thread contact each other in the engaged threads of the pin and box,
wherein the thread of at least one of the pin and box has a stabbing flank which comprises a first portion on the root side and a second portion on the thread crest side,
the second portion has a larger average angle of slope with respect to a line perpendicular to the longitudinal axis of the joint than the first portion, and
the first portion is parallel to the stabbing flank of the other of the pin and the box.

2. A tubular threaded joint as set forth in claim 1 wherein the lip length is at least 160 times the stabbing flank clearance.

3. A tubular threaded joint as set forth in claim 1 wherein the stabbing flank clearance is at least 0.01 mm.

4. A tubular threaded joint as set forth in claim 1 wherein the stabbing flank clearance is at most 0.3 mm.

5. A tubular threaded joint as set forth in claim 1 wherein the first portion has a surface substantially limited in longitudinal section by a straight line and the second portion has a surface selected from a surface substantially limited in longitudinal section by a straight line, a bulging surface, and a concave surface.

6. A tubular threaded joint as set forth in claim 5 wherein the angle of slope of the first portion with respect to a line perpendicular to the longitudinal axis of the joint is in the range of 5-25°.

7. A tubular threaded joint as set forth in claim 5 wherein the average angle of slope of the second portion with respect to a line perpendicular to the longitudinal axis of the joint is in the range of 20-70°.

8. A tubular threaded joint as set forth in claim 1 wherein the thread of one of the pin and the box has a stabbing flank comprising the first and second portions, and the angle of slope of the first portion with respect to a line perpendicular to the longitudinal axis is the same as the angle of the stabbing flank of the thread of the other of the pin and the box.

9. A tubular threaded joint as set forth in claim 1 wherein the product of the height in the radial direction of the first portion of the stabbing flanks and the developed thread length of the engaged threads in the threaded zone is larger than the difference between the nominal radial cross-sectional area of the bodies of pipes being connected and the radial cross-sectional area of the abutting shoulder surfaces of the joint.

10. A tubular threaded joint as set forth in claim 1 wherein the thread crests and roots of the male and female threads are parallel to the axial direction of the tubular threaded joint.

11. A tubular threaded joint as set forth in claim 1 wherein the angle of slope of the load flanks of the male and female threads with respect to a line perpendicular to the longitudinal axis of the joint is in the range of −5° to +5°.

12. A tubular threaded joint as set forth in claim 1 wherein for the thread of at least one of the pin and the box, the load flank comprises two portions in the form of a third portion on the root side and a fourth portion on the thread crest side, and the fourth portion has a larger average angle of slope with respect to a line perpendicular to the longitudinal axis than the third portion.

13. A tubular threaded joint as set forth in claim 12 wherein the fourth portion has either a surface substantially limited in longitudinal section by a straight line or a bulging surface.

14. A tubular threaded joint as set forth in claim 1 wherein each of the pin and the box has a metal-to-metal seal surface between its shoulder surface and its threaded zone.

15. A tubular threaded joint as set forth in claim 14 wherein the metal-to-metal seal surface is disposed in the vicinity of the threaded zone.

16. A tubular threaded joint as set forth in claim 14 wherein each of the pin and the box has a noncontacting region where the pin and box do not contact each other between the metal-to-metal seal surface and the shoulder surface.

* * * * *